(12) United States Patent
Hunt et al.

(10) Patent No.: US 11,696,148 B2
(45) Date of Patent: *Jul. 4, 2023

(54) MAPPING GEOGRAPHIC AREAS USING LIDAR AND NETWORK DATA (71) Applicant: TeleqoTech, Falls Church, VA (US)

(72) Inventors: Katherine Carey Hunt, Falls Church, VA (US); Edward Rene Sanchez Carter, Niceville, FL (US); Kyle Andrew Metiva, Reston, VA (US)

(73) Assignee: TeleqoTech, Falls Church, VA (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/133,071

(22) Filed: Dec. 23, 2020

(65) Prior Publication Data
US 2022/0066023 A1 Mar. 3, 2022

Related U.S. Application Data (63) Continuation of application No. 17/009,759, filed on Sep. 1, 2020, now Pat. No. 10,955,545.

(51) Int. Cl.
H04W 16/18 (2009.01)
G01S 13/89 (2006.01)
H04W 76/15 (2018.01)
H04B 7/0456 (2017.01)
G01S 13/86 (2006.01)
G06V 10/80 (2022.01)
G06V 20/13 (2022.01)
G01S 17/931 (2020.01)
G05D 1/00 (2006.01)
G01S 17/88 (2006.01)
G01S 17/89 (2020.01)

(52) U.S. Cl.
CPC ............ *H04W 16/18* (2013.01); *G01S 13/865* (2013.01); *G01S 13/89* (2013.01); *G06V 10/803* (2022.01); *G06V 20/13* (2022.01); *H04B 7/0473* (2013.01); *H04W 76/15* (2018.02); *B60W 2420/42* (2013.01); *G01S 17/88* (2013.01); *G01S 17/89* (2013.01); *G01S 17/931* (2020.01); *G05D 1/0088* (2013.01); *G05D 2201/0213* (2013.01)

(58) Field of Classification Search
CPC ........ G01S 13/89; G01S 13/865; G01S 17/88; G01S 17/89; G01S 17/931; G01S 5/02521; H04B 7/0473; H04W 76/15; H04W 16/18; H04W 4/40; H04W 4/38; H04W 36/00837; H04W 4/33; B60W 2420/42; G05D 1/0088; G05D 2201/0213; G06V 2201/12; G06V 20/13; G06K 9/6289
See application file for complete search history.

(56) References Cited

U.S. PATENT DOCUMENTS 10,955,545 B1 * 3/2021 Hunt .................... G06V 10/803
11,514,208 B2 * 11/2022 Harrison ................ G01C 11/00
2021/0160702 A1 * 5/2021 Harrison ............. H04W 16/225

* cited by examiner

Primary Examiner — Olumide Ajibade Akonai
(74) Attorney, Agent, or Firm — Ramya Possett (57) ABSTRACT A geographic area mapping system may enable collecting, from a set of mobile devices, radio frequency data, the radio frequency data comprising information about a set of network connections in the geographic area; collecting lidar data for the geographic area; generating a mapping between the collected radio frequency data and the collected lidar data for the geographic area; and providing a visualization of the mapped radio frequency data and lidar data for the geographic area.

20 Claims, 4 Drawing Sheets

MAPPING GEOGRAPHIC AREAS USING LIDAR AND NETWORK DATA

CROSS-REFERENCE TO RELATED APPLICATION

This application is a continuation application of U.S. patent application Ser. No. 17/009,759, filed on 1 Sep. 2020, and entitled "MAPPING GEOGRAPHIC AREAS USING LIDAR AND NETWORK DATA".

BACKGROUND

The collection of data about environments and geographic areas is becoming increasingly important as people and organizations try to understand the physical and technological entities in those environments and geographic areas. Determining useful information about environments and geographic areas can be incredibly difficult given the increasing amount of data and data sources about these environments and geographic areas.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The collection of data about environments and geographic areas is becoming increasingly important as people and organizations try to understand the physical and technological entities in those environments and geographic areas. Determining useful information about environments and geographic areas can be incredibly difficult given the increasing amount of data and data sources about these environments and geographic areas.

Examples disclosed herein provide technical solutions to these technical challenges by mapping geographic areas in an automated way that enables visualizations, analytics, and recommendations related to the geographic area. The solutions described herein enable an improved and effective analysis and presentation of a complicated, large set of data related to mapping a geographic area. Further, by collecting and analyzing information about both the physical and technological entities about a geographic area, the technical solutions disclosed herein also enable optimization of the physical and especially technological entities in the geographic area in a myriad of ways.

Some examples disclosed herein enable collecting, from a set of mobile devices, radio frequency data, the radio frequency data comprising information about a set of network connections in the geographic area; collecting lidar data for the geographic area; generating a mapping between the collected radio frequency data and the collected lidar data for the geographic area; and providing a visualization of the mapped radio frequency data and lidar data for the geographic area.

Some of the examples disclosed herein to map geographic areas enable collecting, via a set of mobile devices, radio frequency data, the radio frequency data comprising information about a set of network connections and a set of Global Positioning System (GPS) coordinates in the geographic area; collecting lidar data for the geographic area; generating a mapping between the collected radio frequency data and the collected lidar data for the geographic area; and providing a visualization of the mapped radio frequency data and lidar data for the geographic area over a lidar point cloud for the geographic area.

Some examples disclosed herein enable instructions to collect, from a set of mobile devices, radio frequency data, the radio frequency data comprising information about a set of wireless network connections in a geographic area; instructions to collect lidar data for the geographic area; instructions to generate a mapping between the collected radio frequency data and the collected lidar data for the geographic area; and instructions to provide a visualization of the wireless network connections with the collected lidar data over a lidar point cloud for the geographic area.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Figure 1:
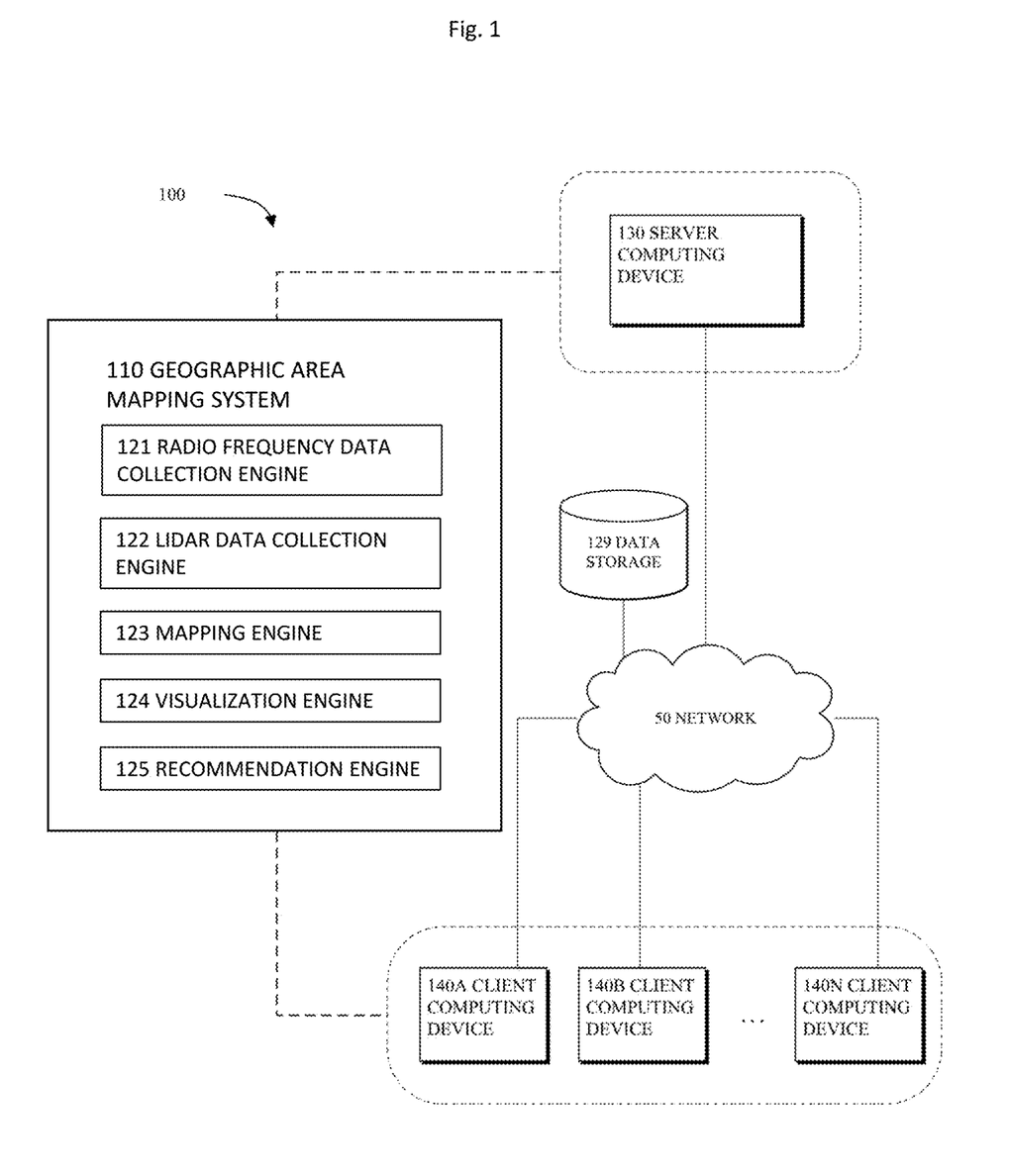
FIG. 1 is a block diagram depicting an example environment in which various examples may be implemented as a geographic area mapping system.

FIG. 1 is an example environment 100 in which various examples may be implemented as a geographic area mapping system 110. In some examples, environment 100 may include various components including server computing device 130 and mobile devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from mobile devices 140. Mobile devices 140 may be any type of mobile computing device capable of sending and/or receiving data to server computing device 130. For example, mobile devices 140 may include a laptop computing device, an all-in-one computing device, a thin client, a workstation, a tablet computing device, a mobile phone, an electronic book reader, a network-enabled appliance such as a "Smart" speaker, a network-connected radio, a software defined radio, wideband tuner, and/or other electronic device suitable for collecting data and transmitting that data to the server computing device 130. While server computing device 130 is depicted as a single computing device, server computing device 130 may include any number of integrated or distributed computing devices serving at least one software application for consumption by mobile devices 140. Data store 129 can be any non-transitory machine-readable storage. In some examples, data store 129 can comprise an Solid State Drive (SSD), Hard Disk Drive (HDD), a database, a networked database storage system, a cloud storage, and/or other type of data store that stores information related to geographic area mapping system 110.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

According to various implementations, geographic area mapping system 110 and the various components described herein may be implemented in hardware and/or a combination of hardware and programming that configures hardware. Furthermore, in FIG. 1 and other Figures described herein, different numbers of components or entities than depicted may be used.

Geographic area mapping system 110 may comprise a radio frequency data collection engine 121, a lidar data collection engine 122, a mapping engine 123, a visualization engine 124, recommendation engine 125, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Radio frequency data collection engine 121 may collect radio frequency data from the set of mobile devices 140. In some examples, radio frequency data collection engine 121 may collect radio frequency data by passively collecting information transmitted via radio frequencies available in the geographic area (e.g., frequencies from the HF/VHF/UHF spectrum to 5G and higher frequencies). In some examples, radio frequency data collection engine 121 may continually collect radio frequency data from the set of mobile devices 140, or may collect the radio frequency data at predetermined, random, and/or user-initiated intervals.

In some examples, radio frequency data collection engine 121 may collect the radio frequency data from the set of mobile devices 140 via an application installed on each of the set of mobile devices 140 that enables collection of the radio frequency data. For example, the application installed on each of the set of mobile devices 140 may monitor the radio frequencies in the geographic area to collect radio frequency data. In some examples, the radio frequency data collection engine 121 may receive the radio frequency data from the application installed on each of the mobile devices 140 via network 50. In some of these examples, the application installed on each of the set of mobile devices 140 may launch automatically upon the mobile device being in an active state. In some of these examples, the application installed on each of the set of mobile devices 140 may show a visual indicator that depicts whether the application is collecting radio frequency data via the respective mobile device. In some examples, the application installed on each of the set of mobile devices 140 may include an auto-discovery functionality that enables each mobile device 140 to determine and/or identify all available mobile devices in the geographic area, and/or add additional IP addresses related to additional mobile devices in the geographic area.

The radio frequency data collected by the radio frequency data collection engine 121 may comprise, for example, information about a set of network connections in the geographic area. In some examples, the information about the set of network connections in the geographic area may comprise information about a set of wireless network connections, a set of GPS coordinates, and/or other information about a network connection. The set of GPS coordinates may have a one-to-one correlation with the set of wireless network connections, such that the information about each wireless network connection may be associated with a distinct set of GPS coordinates. In some examples, a wireless network connection may comprise any radio frequency signals transmitting in the environment, including but not limited to mobile networks, WiFi, Bluetooth, microwave, millimeter wave, high frequency (HF), very high frequency (VHF), and ultra high frequency (UHF).

In some examples, information about a wireless network connection may include properties about the wireless network connection, such as the mobile network carrier, radio type, signal strength data, mobile country code (MCC) data, mobile network code (MNC) data, location area code (LAC)/tracking area code (TAC) data, cellular ID, frequency data, band data, E-UTRA absolute radio frequency channel number (EARFCN)/UTRA absolute radio frequency channel number (UARFCN)/absolute radio frequency channel number (ARFCN) data, received signal strength indicator (RSSI)/reference signal received power (RSRP) data, carrier frequency data, modulation data, baud rate data, a timestamp/last observed date, GPS coordinates (e.g., longitude, latitude, speed, and/or other GPS information), an address, a source, and/or other properties about the wireless network connection. In some examples, information about a wireless network connection may include properties about WiFi network connections, such as service set identifier (SSID), type of device, protocol, encryption scheme, signal strength, channel, data rate, number of clients, basic SSID (BSSID), a timestamp/last observed date, GPS coordinates (e.g., longitude, latitude, speed, and/or other GPS information), and/or other properties about the wireless network connection.

Upon collection of the radio frequency data from the set of mobile devices 140 in the geographic area, radio frequency data collection engine 121 may store the collected radio frequency data in data storage 129.

Lidar data collection engine 122 may collect lidar data in the same geographic area as the radio frequency data collection engine 121. In some examples, lidar data collection engine 122 may collect the lidar data via a set of mobile devices, via an appliance configured to obtain lidar data from a geographic area, from a data storage (like data storage 129), from an external data source, and/or by another device or source that comprises lidar data for the geographic area. In some examples, information about lidar data in a geographic area may include properties about the lidar data, such as information about physical objects detected in the geographic area, measurements of distance between physical objects detected in the geographic area, imagery data in the geographic area, GPS coordinates (e.g., longitude, latitude, speed, and/or other GPS information), an address, a source, a timestamp, and/or other properties about the lidar data.

In some examples, the imagery data included in the lidar data may include photographic imagery. In some examples, the lidar data collection engine 122 may collect imagery data in the geographic area in a manner similar to or different from the collection of the lidar data. For example, in some of these examples, the lidar data collection engine 122 may collect the imagery data from sources different from the sources from which the lidar data is collected. The lidar data collection engine 122 may collect the imagery data via the set of mobile devices, via web sources, via an appliance configured to obtain imagery data from a geographic area, from a data storage (like data storage 129), from an external data source, and/or by another device or source that comprises imagery data for the geographic area.

In some examples, lidar data collection engine 122 may continually collect lidar data for the geographic area, or may collect the lidar data at predetermined, random, and/or user-initiated intervals. Upon collection of the lidar data in the geographic area, lidar data collection engine 122 may store the collected lidar data in data storage 129.

In some examples, lidar data collection engine 122 may superimpose the collected lidar data for the geographic area on a lidar point cloud. In some of these examples, the lidar data collection engine 122 may store the collected lidar data and the lidar point cloud in the data storage 129.

Mapping engine 123 may generate a mapping between the collected radio frequency data and the collected lidar data for the geographic area. In some examples, mapping engine 123 may map the collected radio frequency data and the collected lidar data by matching a set of GPS coordinates from the radio frequency data with a corresponding set of GPS coordinates from the lidar data. Mapping engine 123 may store the generated mapping in data storage 129. In some examples, mapping engine 123 may superimpose the generated mapping on a lidar point cloud, map, and/or other depiction of the geographic area. In some of these examples, mapping engine 12 may store the mapped radio frequency data, mapped lidar data, and geographic area depiction in the data storage 129.

The visualization engine 124 may provide a visualization of the mapped radio frequency data and lidar data for the geographic area. In some examples, the visualization engine 124 may provide the visualization of the mapped radio frequency data and the mapped lidar data over a lidar point cloud for the geographic area.

Figure 2A:
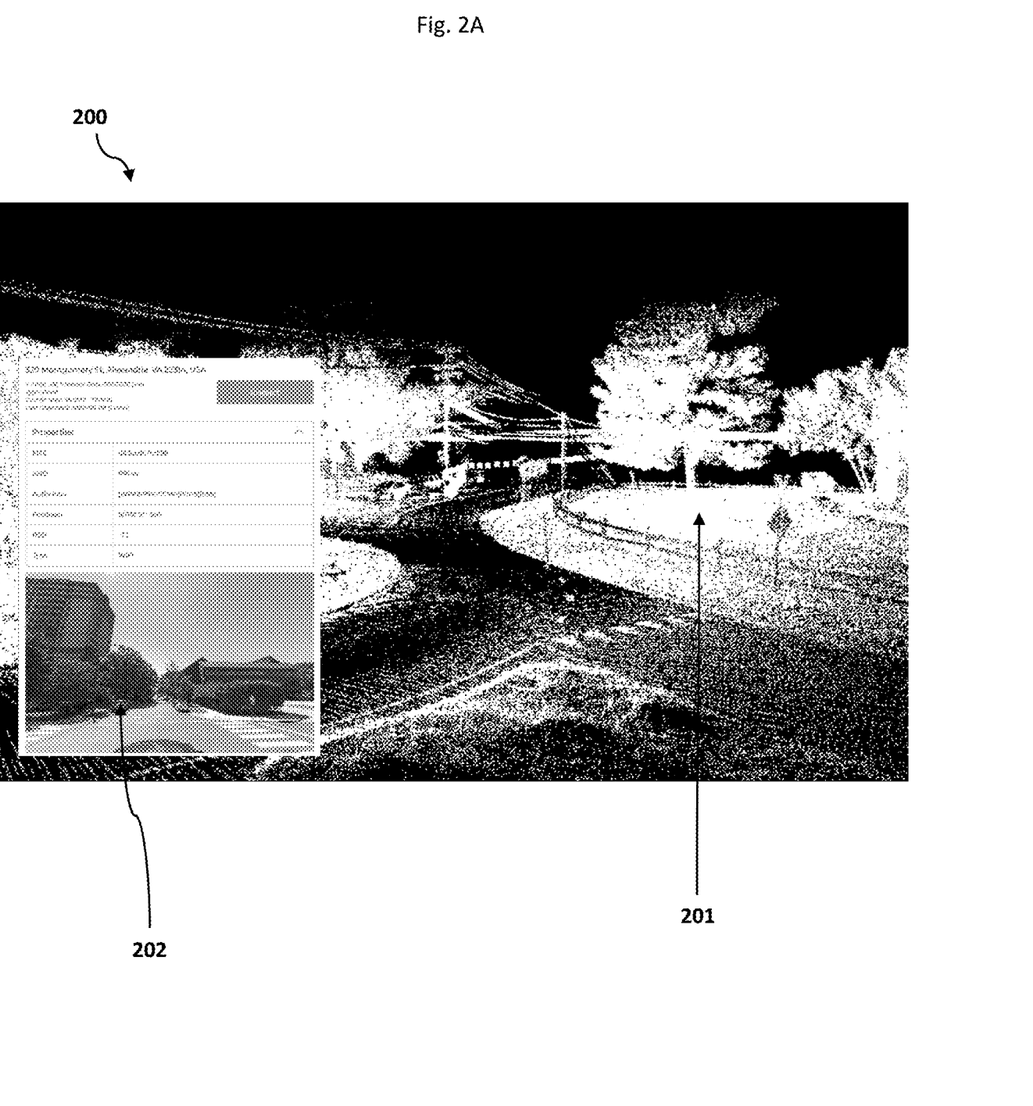
FIG. 2A is a diagram depicting an example user interface for mapping a geographic area.
Figure 2B:
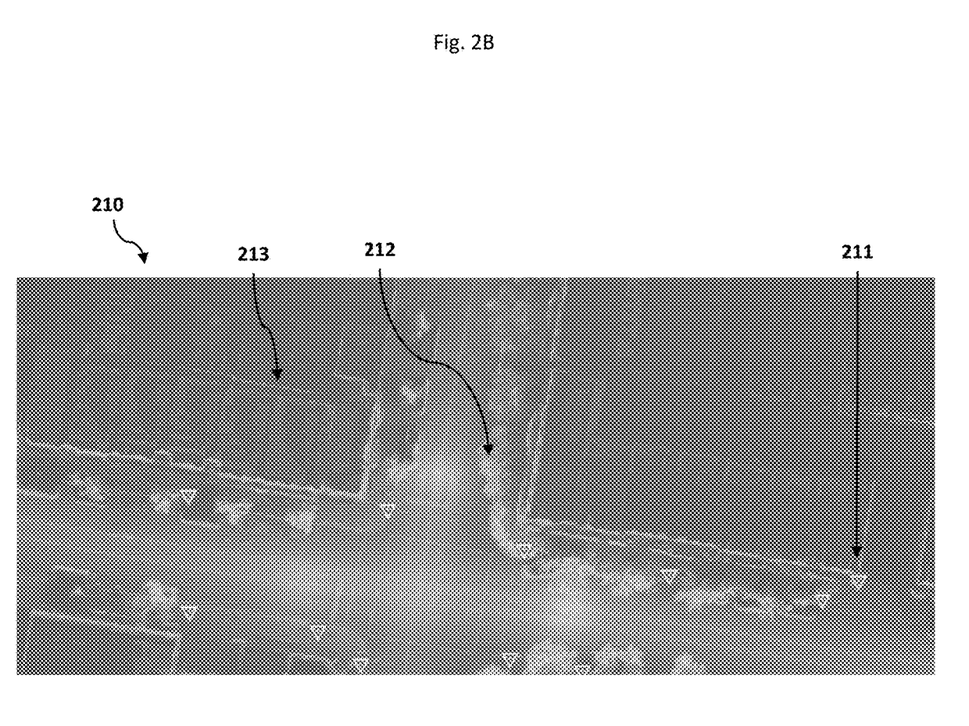
FIG. 2B is a diagram depicting an example user interface for mapping a geographic area.

In the examples illustrated in FIGS. 2A and 2B, visualizations of the mapped radio frequency data and lidar data over a lidar point cloud is depicted. The visualizations available via the visualization engine 124 are not limited to the visualizations depicted in FIGS. 2A and 2B.

In FIG. 2A, one example of visualization 200 of the imagery data, radio frequency data, and lidar data over a lidar point cloud is depicted. In the example illustrated in FIG. 2A, the radio frequency data may be represented by an overlay box 202 over the lidar point cloud 201. The overlay may include further information about wireless data included in the radio frequency data. Example of the type of wireless data shown in overlay box 202 is not limited to the type of radio frequency data that could be included in the overlay box 202. In some examples, the data shown in the overlay box 202 may be a predetermined set of data, may be determined from a user request to the visualization engine 124, may be machine learned from the geographic area mapping system 110, and/or may otherwise be determined.

In FIG. 2B, another example of visualization 210 of the imagery data, radio frequency data, and lidar data over a lidar point cloud is depicted. In the example illustrated in FIG. 2B, the radio frequency data may be represented by a set of graphical elements 211, the lidar data may be represented by a lidar point cloud 212, and the imagery data 213 may be represented by imagery included in the visualization 210.

Returning to FIG. 1, the visualization engine 124 may provide a visualization of the mapped radio frequency data and lidar data for the geographic region over other types of depictions of the geographic area as well, such as a geographical map, topographical map, highway map, photographic map, heat map, and/or other map type depicting of the geographic area. The visualization engine 124 may also provide different types of visualizations of the geographic area, including, but not limited to a lidar point cloud, lidar map, wireless map, colorized lidar point cloud, and/or other base type of visualization upon which additional data may be overlaid. For example, the visualization engine 124 may provide a map depicting the physical locations associated with properties associated with the collected radio frequency data and collected lidar data. In another example, the visualization engine 124 may provide a heat map related to the mapped radio frequency data and mapped lidar data to better depict the relationship between the physical terrain and signal strengths in the geographic area.

In some examples, the visualization engine 124 may provide one or multiple map types and/or visualizations related to the mapped data. In some examples, the visualization engine 124 may enable the changing of visualization from one map to another. For example, the visualization engine may enable the change of a visualization from a lidar point cloud to photographic imagery, may combine the lidar point cloud and the photographic imagery to enable a colorized lidar point cloud. In another example, the visualization engine 124 may enable changing from a combination of map type and visualization type (e.g., heat map and lidar point cloud to geographical map and colorized lidar point cloud). The types of maps and types of visualizations of the mapped radio frequency data and lidar data are not limited to the examples described herein, and can be changed based on the context of use of the mapped radio frequency data and lidar data as well.

In some examples, the visualization engine 124 may enable narrowing, filtering, or selection of smaller geographic areas of the geographic region. In some examples, the visualization engine 124 may enable selection of one or multiple individual data points from the radio frequency data, the lidar data, the mapped radio frequency data and lidar data, and/or other data available via the visualization. In some of these examples, the visualization engine 124 may provide further information related to the selected individual data point(s) via the visualization.

In some examples, the visualization engine 124 may provide a time-bound visualization of the mapped radio frequency data and lidar data. For example, the visualization engine 124 may include a time bar or other time indicator that may be selectable or changed. In these examples, the visualization engine may enable a visualization of the change of the mapped radio frequency data and lidar data for the geographic area over time, based on a selection of a specific time or time range via the time bar/time indicator. In some of these examples, the visualization engine 124 may provide a special indicator for objects and/or individual data points of the collected radio frequency data and/or lidar data that appear or disappear as the time bar/time indicator selection is changed.

Recommendation engine 125 may provide a recommendation based on the mapped radio frequency data and lidar data.

In some examples, recommendation engine 125 may provide a recommendation to optimize the set of network connections. For example, the recommendation engine 125 may compare signal strength from the collected radio frequency data across time and/or from multiple mobile devices 140 to determine specific sub-areas in the geographic area where the signal strength is lower than an average or expected signal strength. In some of these examples, the recommendation engine 125 may compare the signal strength from the collected radio frequency data with the physical objects from the collected lidar data to determine optimal placement of network devices (such as antennas, network boosters, and/or other network devices) to enhance the signal strength.

In some of these examples, the recommendation engine 125 may provide a visualization via the visualization engine 124 to depict optimal antenna positions for a wireless network. For example, the visualization engine 124 may depict symbols that indicate placement and dimensions of physical objects in the geographic area based on the collected lidar data, and may depict wireless network coverage information for the geographic area based on the collected radio frequency data. In addition, the visualization engine 124 may depict the optimal placement of network devices in the geographic area.

In some examples, recommendation engine 125 may use the collected radio frequency data and collected lidar data to make predictions about a network event that could occur. For example, the recommendation engine may analyze the collected radio frequency data and lidar data in a geographic area over time to determine a degradation of signal strength in a sub-area of the geographic area, a loss of a network device, a need for additional network device(s) to improve signal strength, a drop in network coverage, a new signal that has been collected, a new physical object that has been detected, or some other type of network event has occurred. In some examples, the network event may comprise the prediction of signal strength at a given geographical coordinate at a future point in time. In some examples, the network event may comprise a difference between expected network coverage and existing signal coverage exceeding a predetermined threshold, based on collected radio frequency data related to signal strength.

In some of these examples, recommendation engine 125 may provide an alert related to the predicted network event. For example, the recommendation engine 125 may provide an alert that a network event may occur at a determined time interval, or may provide information about the network event.

In some of these examples, recommendation engine 125 may analyze the mapped radio frequency data and lidar data over time to provide a plan for maintenance and upgrades of the wireless network(s) in the geographic area.

In some of these examples, recommendation engine 125 may analyze the mapped radio frequency data and lidar data to recognize sources of interference in the geographic area.

In some of these examples, recommendation engine 125 may analyze the mapped radio frequency data and lidar data to plan spectrum usage in the geographic area.

In some of these examples, recommendation engine 125 may analyze the mapped radio frequency data and lidar data to provide feedback to a telecommunications provider on deconfliction of frequency bands in licensed and unlicensed space based on the measured signal strength and physical terrain information included in the collected radio frequency data and collected lidar data.

In some examples, recommendation engine 125, and geographic area mapping system 110 as a whole, may provide ground truth data to telecommunication providers about the mapped geographic area. Geographic area mapping system 110 may provide recommendations related to positions of network devices and plans for maintenance and upgrades of the telecommunication network provider's network in the geographic area. In some of these examples, telecommunications providers that provide high radio frequency networks (e.g., 5G, 6G, and/or other high radio frequency networks) may use geographic area mapping system 110 for a better implementation and roll out of their high radio frequency network.

In some examples, geographic area mapping system 110 may enable the embedding of the mapped radio frequency data and lidar data in an augmented reality and/or virtual reality environment. In some of these examples, geographic area mapping system 110 may enable the visualization of the geographic area with the mapped radio frequency data and lidar data (and associated data) in the augmented and/or virtual reality world.

In some examples, geographic area mapping system 110 may collect the radio frequency data and lidar data from a geographic area and from vehicles, scooters, segways, aircraft, drones, and/or other transportation devices that use wireless signals for data. In these examples, geographic area mapping system 100 may use the collected radio frequency data and collected lidar data to improve autonomous functionality of these transportation devices, including physical object avoidance and better signal strength and coverage.

In some examples, geographic area mapping system 110 may provide information related to infrastructure (e.g., roads, rest areas, and/or other infrastructure objects) that may be covered by cellular and WiFi signals to assist in communication and planning related to infrastructure, construction, and/or other transportation related needs.

In some examples, geographic area mapping system 110 may analyze the mapped radio frequency data and lidar data in a set of geographic areas to track vehicles and goods moving through the set of geographic areas. In some of these examples, the geographic area mapping system 110 may use the mapped radio frequency and lidar data in the set of geographic areas to provide an optimal route for the vehicles and/or goods.

In some examples, the geographic area mapping system 110 may analyze the mapped radio frequency data and lidar data to determine optimal placement of environmental sensors, IoT sensors, and/or other sensors in a geographic area. In some examples, the sensors may be used to monitor conditions related to natural disasters, critical drainage infrastructure, and/or other municipal emergencies. In other examples, the sensors may be used to monitor conditions with factories, plants, data centers, land-based oil pipelines, oil drilling platforms, solar wind farms, vending machines, payment processing machines, and/or for other corporate uses. In some examples, the geographic area mapping system 100 may predict new deployments of sensors and/or other equipment related to the analysis of the mapped radio frequency data and lidar data.

In some examples, geographic area mapping system 110 may analyze the mapped radio frequency data and lidar data to increase public safety. For example, the geographic area mapping system 100 may provide alerts and/or predictions related to coverage using collected data related to police dashboard, body cam, and/or other police related, network enabled equipment. Similarly, the geographic area mapping system 110 may enhance coverage for fire departments based on sensors available with ambulances and reduce response time based on the mapped radio frequency data and lidar data.

In performing their respective functions, engines 121-125 may access data storage 129 and/or other suitable database(s). Data storage 129 may represent any memory accessible to geographic area mapping system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Geographic area mapping system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

FIGS. 2A and 2B are diagrams depicting an example user interface 200 for mapping a geographic area. FIGS. 2A and 2B are described herein with respect to FIG. 1.

Figure 3:
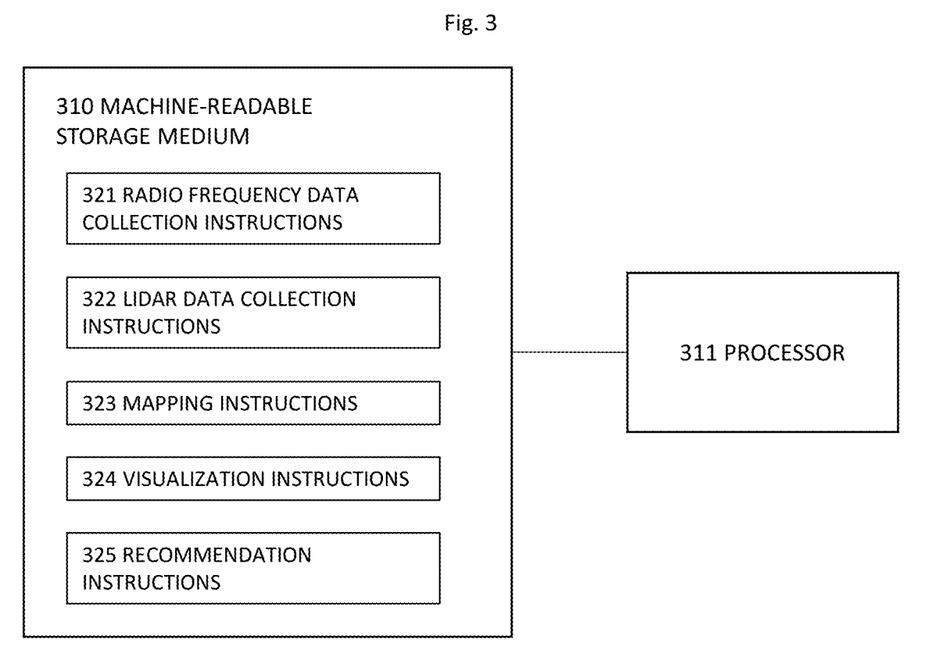
FIG. 3 is a block diagram depicting an example machine-readable storage medium comprising instructions executable by a processor for mapping a geographic area.

FIG. 3 is a block diagram depicting an example machine-readable storage medium 310 comprising instructions executable by a processor for mapping a geographic area.

In the foregoing discussion, engines 121-125 were described as combinations of hardware and programming. Engines 121-125 may be implemented in a number of fashions. Referring to FIG. 3, the programming may be processor executable instructions 321-325 stored on a machine-readable storage medium 310 and the hardware may include a processor 311 for executing those instructions. Thus, machine-readable storage medium 310 can be said to store program instructions or code that when executed by processor 311 implements geographic area mapping system 110 of FIG. 1.

In FIG. 3, the executable program instructions in machine-readable storage medium 310 are depicted as radio frequency data collection instructions 321, lidar data collection instructions 322, mapping instructions 323, visualization instructions 324, and recommendation instructions 325. Instructions 321-325 represent program instructions that, when executed, cause processor 311 to implement engines 121-125, respectively.

Machine-readable storage medium 310 may be any electronic, magnetic, optical, or other physical storage device that contains or stores executable instructions. In some implementations, machine-readable storage medium 310 may be a non-transitory storage medium, where the term "non-transitory" does not encompass transitory propagating signals. Machine-readable storage medium 310 may be implemented in a single device or distributed across devices. Likewise, processor 311 may represent any number of processors capable of executing instructions stored by machine-readable storage medium 310. Processor 311 may be integrated in a single device or distributed across devices. Further, machine-readable storage medium 310 may be fully or partially integrated in the same device as processor 311, or it may be separate but accessible to that device and processor 311.

In one example, the program instructions may be part of an installation package that when installed can be executed by processor 311 to implement geographic area mapping system 110. In this case, machine-readable storage medium 310 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-325, and/or other instructions. As an alternative or in addition to retrieving and executing instructions, processor 311 may include at least one electronic circuit comprising a number of electronic components for performing the functionality of at least one of instructions 321-325, and/or other instructions.

Figure 4:
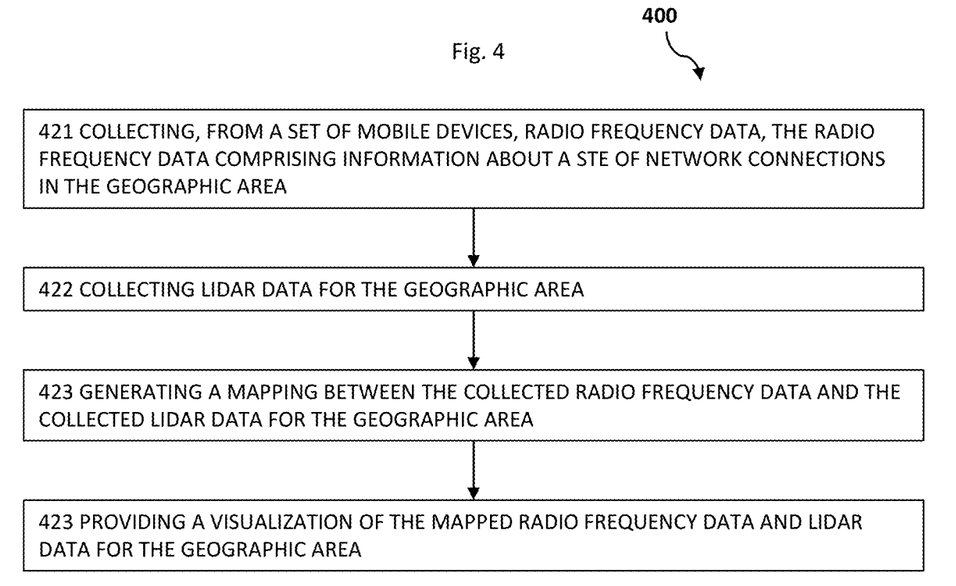
FIG. 4 is a flow diagram depicting an example method for mapping a geographic area.

FIG. 4 is a flow diagram depicting an example method 400 for mapping a geographic area. The various processing blocks and/or data flows depicted in FIG. 4 (and in the other drawing figures described herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 400 as illustrated (and described in greater detail below) is meant to be an example and, as such, should not be viewed as limiting. Method 400 may be implemented in the form of executable instructions stored on a machine-readable storage medium, such as storage medium 310, and/or in the form of electronic circuitry.

In block 421, method 400 may include collecting, from a set of mobile devices, radio frequency data, the radio frequency data comprising information about a set of network connections in the geographic area. Referring to FIG. 1, radio frequency data collection engine 121 may be responsible for implementing block 421.

In block 422, method 400 may include collecting lidar data for the geographic area. Referring to FIG. 1, lidar data collection engine 122 may be responsible for implementing block 422.

In block 423, method 400 may include generating a mapping between the collected radio frequency data and the collected lidar data for the geographic area. Referring to FIG. 1, mapping engine 123 may be responsible for implementing block 423.

In block 423, method 400 may include providing a visualization of the mapped radio frequency data and lidar data for the geographic area. Referring to FIG. 1, visualization engine 124 may be responsible for implementing block 423.

The foregoing disclosure describes a number of example implementations for mapping a geographic area. The disclosed examples may include systems, devices, computer-readable storage media, and methods for mapping a geographic area. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A method for mapping a geographic area, comprising:
   collecting, from a set of mobile devices, radio frequency data, the radio frequency data comprising information about a set of network connections in the geographic area;
   collecting lidar data for the geographic area;
   generating a mapping between the collected radio frequency data and the collected lidar data for the geographic area;
   providing a visualization of the mapped radio frequency data and lidar data for the geographic area;
   predicting, based on the collected radio frequency data and the collected lidar data, that a network event is going to occur; and
   providing an alert related to the predicted network event.

2. The method of claim 1, wherein collecting, from the set of mobile devices, radio frequency data comprises:
   collecting, via an application installed on each of the mobile devices, the radio frequency data, wherein the radio frequency data collected from each of the mobile devices comprises a set of GPS coordinates and a set of wireless network connections.

3. The method of claim 1, wherein generating the mapping between the collected radio frequency data and the collected lidar data comprises:
   mapping the collected radio frequency data and the collected lidar data by matching the set of GPS coordinates from the radio frequency data and GPS coordinates associated with the lidar data.

4. The method of claim 1, wherein providing a visualization comprises:
   providing a visualization of the wireless network connections with the collected lidar data over a lidar point cloud for the geographic area.

5. The method of claim 1, wherein providing a visualization comprises:
   providing a first visualization of the mapped radio frequency data and lidar data for the geographic area; and
   providing a second visualization of the mapped radio frequency data and lidar data for the geographic area, wherein the second visualization is different from the first visualization.

6. The method of claim 1, further comprising:
   providing a recommendation, based on the mapped radio frequency data and lidar data, to optimize the set of network connections.

7. The method of claim 6, wherein providing a recommendation comprises:
   providing for display a map of the geographic area that includes:
   symbols indicating placement and dimensions of physical obstacles in the geographic area based on the collected lidar data; and
   wireless network coverage information for the geographic area based on the collected radio frequency data; and
   determining optimal antenna positions for a wireless network.

8. The method of claim 6, further comprising:
   repeatedly collecting the radio frequency data at multiple time intervals; and
   repeatedly collecting the lidar data at the multiple time intervals; and
   wherein providing a recommendation comprises:
   providing a plan for maintenance and upgrades of the wireless network based on the repeatedly collected lidar data and the repeatedly collected radio frequency data.

9. A method for mapping a geographic area, comprising:
   collecting, via a set of mobile devices, radio frequency data, the radio frequency data comprising information about a set of network connections and a set of GPS coordinates in the geographic area;
   collecting lidar data for the geographic area;
   generating a mapping between the collected radio frequency data and the collected lidar data for the geographic area;
   providing a visualization of the mapped radio frequency data and lidar data for the geographic area over a lidar point cloud for the geographic area;
   predicting, based on the collected radio frequency data and the collected lidar data, that a network event is going to occur; and
   providing an alert related to the predicted network event.

10. The method of claim 9, wherein generating the mapping between the collected radio frequency data and the collected lidar data comprises:
    mapping the collected radio frequency data and the collected lidar data by matching the set of GPS coordinates from the radio frequency data and GPS coordinates associated with the lidar data.

11. The method of claim 9, further comprising:
    providing a recommendation, based on the mapped radio frequency data and lidar data, to optimize the set of network connections.

12. The method of claim 11, wherein providing a recommendation comprises:
    providing for display a map of the geographic area that includes:

symbols indicating placement and dimensions of physical obstacles in the geographic area based on the collected lidar data; and wireless network coverage information for the geographic area based on the collected radio frequency data; and determining optimal antenna positions for a wireless network.

13. The method of claim 9, further comprising:

repeatedly collecting the radio frequency data at multiple time intervals; and repeatedly collecting the lidar data at the multiple time intervals; and wherein providing a recommendation comprises:

providing a plan for maintenance and upgrades of the wireless network based on the repeatedly collected lidar data and the repeatedly collected radio frequency data.

14. The method of claim 9, wherein providing a visualization comprises:

providing a first visualization of the mapped radio frequency data and lidar data for the geographic area; and providing a second visualization of the mapped radio frequency data and lidar data for the geographic area, wherein the second visualization is different from the first visualization.

15. A non-transitory machine-readable storage medium comprising instructions executable by a physical processor of a computing device for mapping a geographic area, the machine-readable storage medium comprising:

instructions to collect, from a set of mobile devices, radio frequency data, the radio frequency data comprising information about a set of network connections in a geographic area;

instructions to collect lidar data for the geographic area;

instructions to generate a mapping between the collected radio frequency data and the collected lidar data for the geographic area;

instructions to provide a visualization of the wireless network connections with the collected lidar data over a lidar point cloud for the geographic area;

instructions to predict, based on the collected radio frequency data and the collected lidar data, that a network event is going to occur; and instructions to provide an alert related to the predicted network event.

16. The machine-readable storage medium of claim 15, wherein the instructions to collect radio frequency data comprise:

instructions to collect, via an application installed on each of the mobile devices, the radio frequency data, wherein the radio frequency data collected from each of the mobile devices comprises a set of GPS coordinates and a set of wireless network connections.

17. The machine-readable storage medium of claim 15, wherein the instructions to generate the mapping comprise:

instructions to map the collected radio frequency data and the collected lidar data by matching the set of GPS coordinates from the radio frequency data and GPS coordinates associated with the lidar data.

18. The machine-readable storage medium of claim 15, further comprising:

instructions to provide a recommendation, based on the mapped radio frequency data and lidar data, to optimize the set of network connections.

19. The machine-readable storage medium of claim 18, wherein the instructions to provide a recommendation comprise:

instructions to provide for display a map of the geographic area that includes:

symbols indicating placement and dimensions of physical obstacles in the geographic area based on the collected lidar data; and wireless network coverage information for the geographic area based on the collected radio frequency data; and instructions to determine optimal antenna positions for a wireless network.

20. The machine-readable storage medium of claim 15, wherein the instructions to provide the visualization comprise:

instructions to provide a first visualization of the mapped radio frequency data and lidar data for the geographic area; and instructions to provide a second visualization of the mapped radio frequency data and lidar data for the geographic area, wherein the second visualization is different from the first visualization.

\* \* \* \* \*